(12) United States Patent
Grosseholz et al.

(10) Patent No.: US 7,427,229 B2
(45) Date of Patent: Sep. 23, 2008

(54) METHOD FOR GUTTING BEHEADED AND NON-BEHEADED FISH AND DEVICE FOR IMPLEMENTING THE SAME

(75) Inventors: Werner Grosseholz, Krummesse (DE); Ralf Neumann, Lubeck (DE)

(73) Assignee: Nordischer Maschinenbau Rud. Baader GmbH & Co. KG., Luebeck (DE)

(*) Notice: Subject to any disclaimer, the term of this patent is extended or adjusted under 35 U.S.C. 154(b) by 0 days.

(21) Appl. No.: 10/485,332

(22) PCT Filed: Jul. 24, 2002

(86) PCT No.: PCT/EP02/08268

§ 371 (c)(1),
(2), (4) Date: Jan. 30, 2004

(87) PCT Pub. No.: WO03/013263

PCT Pub. Date: Feb. 20, 2003

(65) Prior Publication Data

US 2004/0203331 A1 Oct. 14, 2004

(30) Foreign Application Priority Data

Aug. 3, 2001 (DE) ................. 101 37 647

(51) Int. Cl.
*A22C 25/14* (2006.01)
(52) U.S. Cl. ..................... 452/106; 452/121
(58) Field of Classification Search .......... 452/106, 452/107, 108, 110, 116, 117, 119, 120, 121, 452/122
See application file for complete search history.

(56) References Cited

U.S. PATENT DOCUMENTS

| | | | | |
|---|---|---|---|---|
| 3,760,457 A | * | 9/1973 | Dillion | 452/106 |
| 3,908,229 A | * | 9/1975 | Harben et al. | 452/116 |
| 4,091,506 A | | 5/1978 | Soerensen et al. | |
| 4,291,436 A | | 9/1981 | Wulff | |
| 4,481,693 A | * | 11/1984 | Cowie et al. | 452/138 |
| 4,507,823 A | * | 4/1985 | Wulff | 452/121 |
| 4,507,824 A | * | 4/1985 | Sawusch | 452/121 |
| 4,976,010 A | * | 12/1990 | Lavelle, Jr. | 452/116 |
| 4,993,116 A | * | 2/1991 | Urushibara et al. | 452/116 |
| 5,026,318 A | * | 6/1991 | Jahnke | 452/116 |
| 5,085,613 A | * | 2/1992 | Ketels | 452/110 |
| 5,098,334 A | * | 3/1992 | Molaug | 452/116 |
| 5,735,735 A | * | 4/1998 | Hahn et al. | 452/119 |
| 5,980,376 A | * | 11/1999 | Grosseholz et al. | 452/116 |
| 6,129,624 A | * | 10/2000 | Niklason | 452/106 |
| 6,638,155 B2 | * | 10/2003 | Jensen et al. | 452/117 |

FOREIGN PATENT DOCUMENTS

| | | |
|---|---|---|
| DE | 198 29 376 A | 2/1999 |
| FR | 2213017 | 8/1974 |
| FR | 2616625 | * 12/1988 |

* cited by examiner

*Primary Examiner*—David J Parsley
(74) *Attorney, Agent, or Firm*—Mattingly, Stanger, Malur & Brundidge, P.C.

(57) ABSTRACT

A method for gutting beheaded and non-beheaded fish, and in particular farmed fish, uses a circular blade with a guide gouge for opening the abdominal cavity. Then, the entrails are aspirated and extracted separately from the aspirating and extracting of the blood and water. Separate suction pipes connected to separate collecting receptacles are used for aspirating and extracting the entrails and the blood and water, respectively.

34 Claims, 3 Drawing Sheets

METHOD FOR GUTTING BEHEADED AND NON-BEHEADED FISH AND DEVICE FOR IMPLEMENTING THE SAME

BACKGROUND OF THE INVENTION

1. Field of the Invention

The invention is concerned with a method for gutting decapitated and undecapitated fish, in particular farmed fish, including the steps of opening the abdominal cavity with a circular blade with guide gouge, scraping out and aspirating the entrails which are then partially detached with a suction nozzle, opening the membrane of the blood kidney, aspirating blood and water with suction scrapers and extracting entrails and blood and water via suction pipes.

Furthermore, the invention concerns an apparatus, in particular for carrying out the method, essentially including a conveyor with at least one fish receptacle for receiving the fish to be processed and conveying it in the direction of the processing station, means arranged in the region of the conveyor for opening the abdominal cavity, for scraping out and aspirating the entrails, for completely opening the membrane of the blood kidney and for aspirating blood and water as well as for extracting entrails and blood and water from the abdominal cavity.

2. Description of Related Art

A method of this kind with a corresponding apparatus for slaughtering and gutting the fish is known from document DE 198 29 376. In the known method, a gouge moves into the anal opening and forms the cutting support for a circular blade which opens the abdominal wall of the fish in the longitudinal direction. So that the circular blade can pass out of the fish unhindered, the gouge is swung back at the end of the cut. Then a first suction nozzle with open suction opening moves into the abdominal cavity, a ball valve in the suction pipe being closed to build up partial pressure in the suction pipe. The ball valve opens at the earliest when the suction nozzle has reached the bottom of the abdominal cavity. The entrails are aspirated and at the end of the abdominal cavity in the region of the lateral fins the suction nozzle is closed by a slide valve, the entrails being cut off with a cutting edge arranged on the slide valve before the suction nozzle swings back and returns to its starting position. During the so-called basic travel of the suction nozzle on the main bone, a blade opens the membrane of the blood kidney from the ventral fins to the end of the abdominal cavity. A subsequent second tool opens the blood kidney in the rear region (from the anus to the ventral fins) and removes blood and water in this region. A further, subsequent, third tool cleans the front region of the abdominal cavity (from the ventral fins to the end of the abdominal cavity) of blood and water, overlapping with the previous tool. All three tools are connected to a central vacuum device which consists of a vacuum pump with a filter, a cyclone and pipes. Entrails, blood and water are separated from the air stream in the cyclone and continuously discharged from the latter by an eccentric spiral pump or the like. The known method and the known apparatus do however have the disadvantage that further use of the entrails is only limited or not possible at all because, amongst other things due to the high speed of transport in the pipes, the separating process and the discharge by means of the eccentric spiral pump, entrails, blood and water occur as a homogeneous pasty mass. The known apparatus further has the disadvantage that, to open the membrane of the blood kidney, the blade of the suction nozzle also slits the entrails open in the longitudinal direction, so that they may be damaged or blood and other fluids may escape from the blood kidney and the innards which can lead to decomposition thereof or contaminate the usable components.

BRIEF SUMMARY OF THE INVENTION

It is therefore an object of the invention to provide a method for gutting decapitated and undecapitated fish which ensures further use of the entrails. Furthermore, it is an object of the invention to provide an apparatus which makes it possible in a simple manner to carry out the method according to the invention.

The objects of the invention are achieved by a method together with the steps mentioned hereinbefore, by the fact that the entrails on the one hand and blood and water on the other hand are collected separately from each other. As a result, the possibility of mixing all the components into a homogeneous mass is excluded, so that at least the separately removed entrails can be delivered for further use.

Advantageously, a suction nozzle is connected to a first vacuum unit with high partial pressure during aspiration of the entrails. This ensures that the entrails can be removed from the abdominal cavity completely and as a unit.

Advantageously, during the upward movement of the suction nozzle out of the fish there is a switch from the first vacuum unit to a second vacuum unit which has a lower partial pressure than the first vacuum unit, a slide valve being opened after switching to the second vacuum unit. These steps ensure that the entrails are in fact aspirated by the first vacuum unit with high partial pressure, but extracted with the second vacuum unit with a lower partial pressure. Due to the lower speed of transport in the suction pipes, the entrails are transported very carefully and without damage, so that they can be further processed later.

In a further preferred development of the method, the entrails are guided at a very low speed into a separate collecting receptacle, wherein the entrails impinge at a low angle to the wall of the collecting receptacle and slide down in the latter. Due to the fact that tangential impingement on the inside of the peripheral surface of the collecting receptacle followed by spiral downward movement in the collecting receptacle is avoided, the entrails pass carefully onto the receptacle floor.

Preferably, the suction scrapers for removing blood and water are connected to the first vacuum unit. As a result, blood and water are delivered to the first vacuum unit, namely, to be more precise, the cyclone, so that mixing with the entrails, which leads to contamination thereof, is prevented.

Preferably, upon opening of the abdominal cavity after entry into the anal opening, the abdominal wall is pulled upwards, that is, away from the entrails. As a result, the risk of possible damage to the entrails which would prevent further use is eliminated.

Furthermore, the objects of the invention are achieved by the fact that the means for aspirating and extracting the entrails on the one hand and the means for aspirating and extracting the blood and water on the other hand are connected by separate pipes to separate collecting receptacles. This separation of individual components allows further use.

In a preferred embodiment of the invention, all the means for aspirating and extracting the entrails and blood and water are connected to a first vacuum unit, the means for aspirating and extracting the entrails being additionally connected to a second vacuum unit. This ensures the possibility of carrying out aspiration of the entrails with the first vacuum unit, which has a higher partial pressure than the second vacuum unit, so that the entrails can be removed completely en bloc, while extraction of the entrails can be effected carefully with the second vacuum unit with a low partial pressure. Due to the temporary separation of the suction nozzle during extraction from the central suction pipe which leads to the first vacuum unit, the entrails are exposed to only weak forces, so that intactness of the entrails is ensured without impairing the function of aspiration.

Advantageously, the connection can be switched at option between the means for aspirating and extracting the entrails, namely the suction nozzle and the two vacuum units, so that a continuous process can be maintained, wherein in each case the necessary partial pressure can be applied as a function of the desired step of the method.

The collecting receptacle for the entrails of a particularly preferred development of the invention is constructed or arranged in such a way that the entrails impinge at a low angle on the peripheral surface of the collecting receptacle, so that the entrails then slide down over it smoothly. Thus careful treatment of the entrails is ensured inside the collecting receptacle as well.

In a further advantageous embodiment of the apparatus according to the invention, the suction nozzle has a blade for opening the membrane of the blood kidney, which is constructed so as to prevent damage to the entrails in the longitudinal direction. This readily prevents in particular decomposition of the entrails by fluids from the innards taking place.

Further preferred developments or embodiments of the invention are apparent from the subsidiary claims and the description. A particularly preferred embodiment of the apparatus as well as the method are described in more detail with the aid of the detailed description and drawings.

DETAILED DESCRIPTION OF THE INVENTION

The apparatus according to FIGS. 1 to 5 is used to gut decapitated and undecapitated fish, in particular farmed fish such as those of the salmon species.

Figure 1:
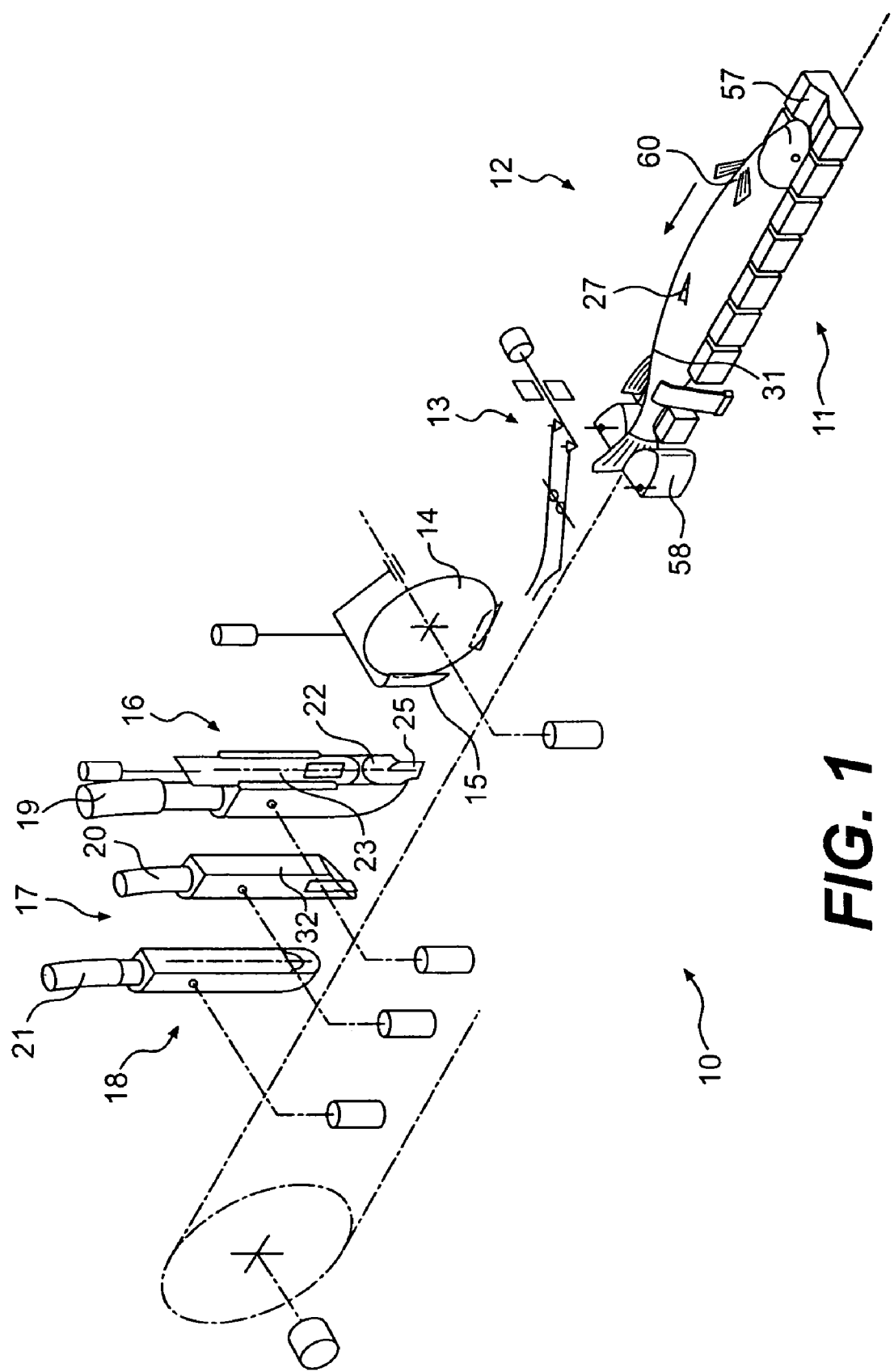
FIG. 1 is a perspective view of essential parts of the apparatus.
Figure 2:
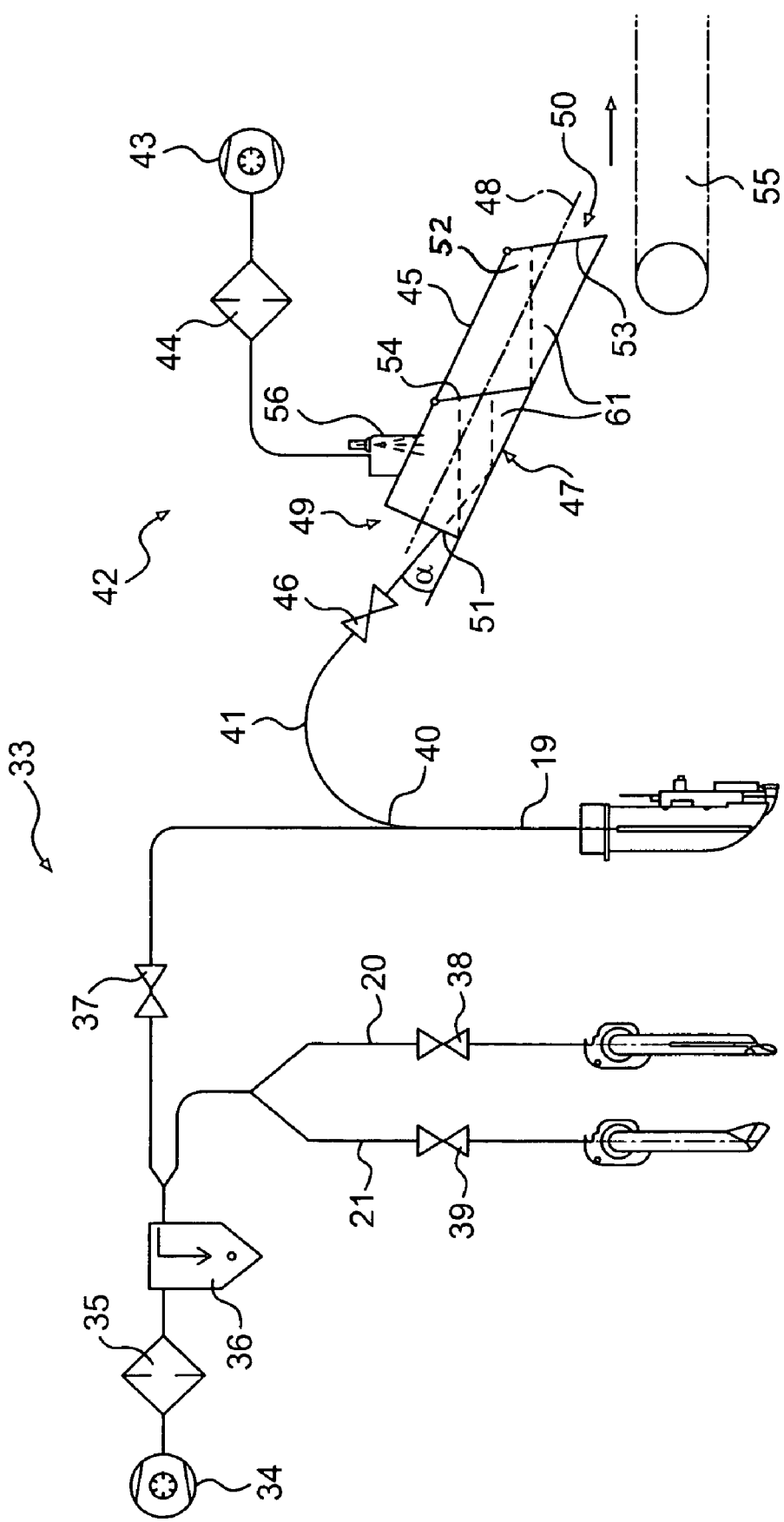
FIG. 2 is a schematic view of details of the apparatus of FIG. 1, namely the vacuum units.
Figure 3:
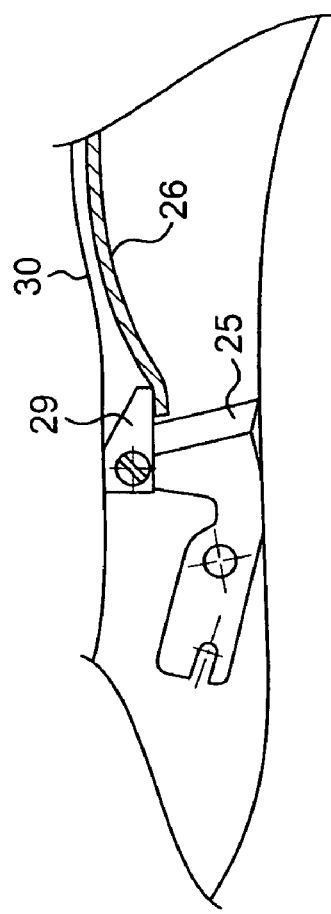
FIG. 3 is an enlarged side view of parts of the suction nozzle with blade of the apparatus of FIG. 1.
Figure 5:
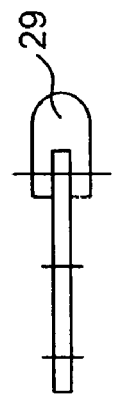
FIG. 5 is a top view of a detail of FIG. 3.
Figure 4:
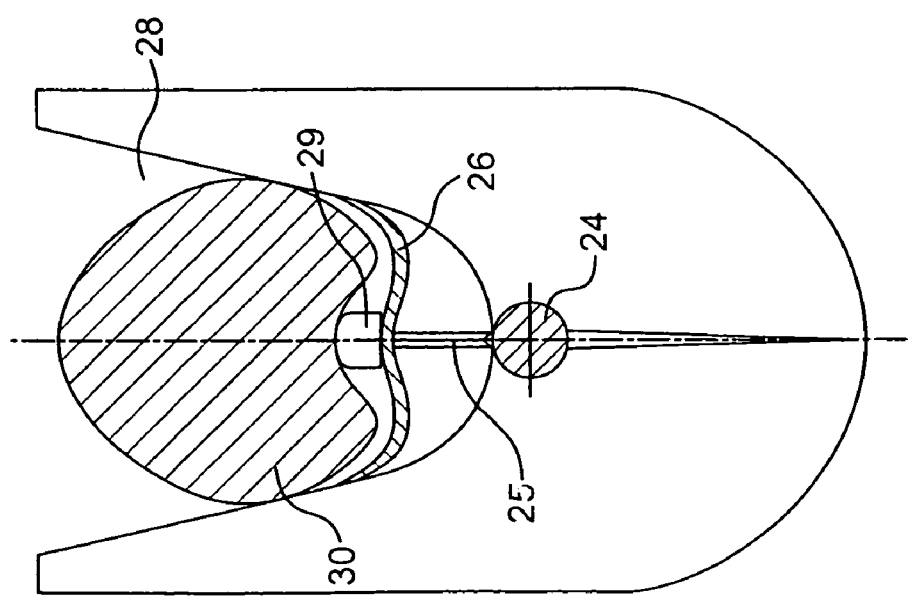
FIG. 4 is a sectional view of a fish's body with the blade of the suction nozzle.

The apparatus 10 shown in particular in FIG. 1 is essentially constructed like the already known apparatus for slaughtering salmon, so that a detailed description of the apparatus 10 itself is superfluous. Only for a better understanding are essential components listed.

The apparatus has a conveyor 11 with which the fish are conveyed tail first and dorsal fin at the bottom. But other positions of the fish can be produced too. Behind the input position 12 in the direction of transport, one behind the other are arranged a measuring device 13, a means for opening the abdominal cavity, namely a circular blade 14 with guide gouge 15, a suction nozzle 16 and suction scrapers 17 and 18. The suction nozzle 16 and the suction scrapers 17 and 18 are connected by suction pipes 19, 20 and 21 to a vacuum unit.

The suction nozzle 16 for scraping out and aspirating the entrails has a hollow body 22 which serves to receive the entrails. The suction nozzle 16 itself can be closed with a guillotine-like slide valve 23. On the lower side facing towards the fish or centre bone 24, the suction nozzle 16 has a blade 25 for opening the membrane 26 of the blood kidney approximately from the ventral fins 27 to the end of the abdominal cavity 28. The blade 25 is designed in such a way that the so-called basic travel of the suction nozzle 16 with the blade 25 takes place on the centre bone 24. The blade 25 has a cover 29 which engages in plough fashion between entrails 30 on the one hand and membrane 26 and separates them from each other.

The suction scraper 17 for opening the membrane 26 approximately from the anus 31 to the ventral fins 27 is likewise constructed as a hollow body 32, blood and water being aspirated and extracted by the latter. The suction scraper 18 following the suction scraper 17 in the direction of transport serves in particular to evacuate, aspirate and extract the remains of blood and water left behind by the suction nozzle 16.

The suction pipes 19 to 21 are all connected to a first vacuum unit 33. The vacuum unit 33 essentially consists of a vacuum pump 34, a filter 35 and a collecting receptacle, namely in particular a cyclone 36. In each suction pipe 19, to 21, between the suction nozzle 16 or the suction scrapers 17, 18 and the vacuum unit 33, is arranged a blocking means, in particular a ball valve 37, 38 or 39. In the suction pipe 19 which connects the suction nozzle 16 to the first vacuum unit 33 is formed a branch. This branch in the region of a switch 40 is arranged in front of the ball valve 37 in the direction of conveying the entrails 30. The switch 40 connects the suction pipe 19 of the suction nozzle 16 via a further suction pipe 41 to a second, separate vacuum unit 42. The second vacuum unit 42 also essentially consists of a vacuum pump 43, a filter 44 and a collecting receptacle 45. The vacuum unit 42 has a lower partial pressure than the vacuum unit 33, so that a lower speed of transport is attained within the suction pipe 19 or 41 for extracting the entrails 30. Between the switch 40 and the collecting receptacle 45 is arranged a further blocking means, in particular a ball valve 46.

The collecting receptacle 45 is specially constructed so that the entering entrails 30 impinge at a low angle α on the inside of the peripheral surface 47. The collecting receptacle 45 itself is U-shaped in the embodiment shown, the peripheral surface 47 being peripherally closed. The collecting receptacle 45 can however be any other shape desired. The collecting receptacle 45 which is arranged with its longitudinal axis 48 inclined is also closed at the end faces 49 and 50. In the input region 51 is provided only the entrance of the suction pipe 41. In the output region 52 the collecting receptacle 45 is to be optionally opened or closed by a pivotable flap 53, a slide valve or the like. Within the collecting receptacle 45 roughly centrally is arranged a dividing means 54 with which the collecting receptacle 45 can be divided. The dividing means 54 can be arranged in any position and designed as a flap, slide valve or the like.

In the output region 52 of the collecting receptacle 45, in the direction of flow of the entrails, is arranged a conveyor belt or screen belt 55 on which the entrails 30 can be deposited. In the input region 51 is arranged a means 56 for detecting the level of the collecting receptacle 45. The means 56 can be designed as a sensor. Other ordinary optical, mechanical or further contactless monitoring means can be used too.

The whole apparatus 10 has a computer unit (not shown) for control and/or regulation, by means of which all components can be controlled in coordination with each other and the operating cycle can be freely programmed and carried out so that individual adaptations with respect to the process cycle can easily be made.

In one embodiment, not shown, the ball valves 37 and 46 in the suction pipes 19 and 42 are replaced by a single ⅔-way valve. The ⅔-way valve is arranged in the region of the switch 40 and can also be controlled by the overriding control and/or regulating unit.

The method for gutting decapitated and undecapitated fish, in particular farmed fish, proceeds as follows. The fish are successively delivered by means of the conveyor 11 to the actual processing station for slaughtering and gutting. The fish mounted in a receptacle 57 and fixed at least in the tail region by clamps 58 or the like is continuously conveyed through the processing station. First the fish reaches the measuring device for gathering fish-specific data. Then the abdominal cavity 28 is opened. For this purpose the guide gouge 15 enters the anus opening. The abdominal cavity 28 is opened in the longitudinal direction of the abdominal wall, beginning from the anus 31 to the end 60 of the abdominal cavity 28, in the region of the lateral fins, detaching the hind gut in the region of the anus 31. After entry into the anal opening, the abdominal wall is pulled upwards, that is, away from the entrails 30, so that the latter remain undamaged.

In the next step the suction nozzle 16 is lowered in the open state, that is, with the slide valve 23 open, into the abdominal cavity 28, this being approximately in the region of the ventral fins 27. The ball valve 37 in the suction pipe 19 is closed to build up a partial pressure within the cyclone 36 as well as in the section of the suction pipe 19 between the ball valve 37 and the cyclone 36. The suction nozzle 16 is lowered so far that the suction nozzle 16 lands with its blade 25 on the centre bone 24. The entrails 30 are now detached by the superimposed speed of transport, pushed together and collected in the hollow body 22 of the suction nozzle 16. The ball valve 37 is opened as late as possible, that is, just before the end 60 of the abdominal cavity 28, so that a strong suction effect (caused by the high partial pressure in the cyclone 36 as well as in the section of the suction pipe 19 between the ball valve 37 and the cyclone 36) arises within the whole suction pipe 19. When the suction nozzle 16 is inserted in the abdominal cavity 28 or when the blade 25 lands on the centre bone 24, the membrane 26 is cut through or pierced by the sickle-shaped blade 25. The sickle shape of the blade 25 causes the membrane 26 to slide upwards, but only to a point below the cover 29 (for state, see FIG. 3). The cover 29 slides between the entrails 30 and the membrane 26 (see in particular FIGS. 3 and 4). This ensures that the blade 25 does in fact slit the membrane 26 open from the pectoral fins 27 to the end 60 of the abdominal cavity 28, but leaves the entrails 30 undamaged, as the cover 29 pushes the entrails 30 upwards away from the blade 25 and guides them into the suction opening of the suction nozzle 16 and at the same time delivers the membrane 26 as a countermove to the blade 25 for slitting it open. At the end 60 of the abdominal cavity 28 the entrails 30 are located completely inside the hollow body 22 of the suction nozzle 16. The slide valve 23 is closed and in the process with its cutting edge separates the entrails 30 overall from the fish's body.

During the upward movement of the suction nozzle 16 out of the abdominal cavity, the connection of the suction nozzle 16 to the first vacuum unit 33 is separated and the suction nozzle 16 is connected to the second vacuum unit 42. This switch is effected by closing the ball valve 37 and opening the ball valve 46 which was previously closed due to the build-up of vacuum in the collecting receptacle and the suction pipe 41. After opening of the ball valve 46, the slide valve 23 is opened so that the entrails 30 are guided into the collecting receptacle 45, now at a lower speed of transport due to the lower partial pressure of the second vacuum unit 42.

Immediately after the entrails 30 of a fish have passed the ball valve 46, the latter can be closed again. The ball valve 37 can now be opened again for the next aspiration process for aspirating the entrails 30 of a subsequent fish, so that the cycle of the suction nozzle 16 can begin again.

The entrails 30 guided into the collecting receptacle 45 at a very low speed impinge at a low angle α (see in particular FIG. 2) on the peripheral surface 47 and slide in the direction of the bottom flap. However, first the entrails 30 slide towards a dividing means 54 which banks up the entrails 30 of several fish to form a filling quantity 61. The means 56 for monitoring the level or filling quantity 61 signals when the front chamber is full. The bottom flap 53 must be closed not later than then, so that the dividing means 54 can be opened, maintaining the partial pressure in the collecting receptacle 45. The entrails 30 then slide into the lower chamber and are stopped by the bottom flap 53. After closing of the dividing means 54, the bottom flap 53 can then be opened for conducting the entrails 30 away onto the conveyor belt and/or screen belt 55. Preferably, the dividing means 54 is closed until the upper chamber is full. Only when no more entrails 30 can be received, does the dividing means 54 open so that the entrails 30 can slide into the lower chamber, which should have at least the same volume as the upper chamber. As soon as all entrails 30 have arrived in the lower chamber, the dividing means 54 is closed. Due to this gate valve function, continuous operation of the apparatus is made possible by means of a SPC system or a computer unit.

After scraping out and aspiration of the entrails 30, in which the membrane 26 is partially opened as well, the suction scraper 17 completely opens the membrane 26 and, together with the suction scraper 18, aspirates the accumulated blood and water. Via the suction pipes 20 and 21, the blood and water are drawn into the cyclone 36 with the ball valves 38, 39 open. The partial pressure for the aspiration or extraction of blood and water has been generated beforehand by the closed ball valves 38, 39 in the cyclone 36 as well as in the sections of the suction pipes 20, 21 between the ball valves 38, 39 and the cyclone 36. Blood and water enter the cyclone 36 tangentially and then drop down, in particular on account of the reduced air speed in the cyclone 36.

The whole method, in particular the control and regulation of all components, e.g. bends of the suction nozzle 16 and suction scrapers 17, 18, switching points of the ball valves 37, 38, 39, 46, the bottom flap 53 and the dividing means 54 and the processing machine itself, is automated by means of a freely programmable computer unit.

The partial pressure of the first vacuum unit 33, which is much greater than the partial pressure in the second vacuum unit 42, causes the speeds of transport in the suction pipes which are connected to the first vacuum unit 33 to be higher by a factor of 10 to 15 than in the suction pipes which are connected to the second vacuum unit 42. This is a fundamental reason why the entrails 30 can be obtained intact with the method according to the invention.

The invention claimed is:

1. A method for gutting decapitated and undecapitated fish, including the steps of:
   opening an abdominal cavity of the fish with a circular blade with guide gouge,
   scraping out and aspirating entrails which are then partially detached with a suction nozzle,
   opening a membrane of a blood kidney and aspirating blood and water with suction scrapers,
   extracting entrails and blood and water via suction pipes, characterized in that:

the entrails on the one hand and blood and water on the other hand are collected separately from each other, the suction nozzle is closed at the end of the abdominal activity by a slide valve provided with a cutting edge, so that the entrails fully separated from the fish's body lie in the suction nozzle and during upward movement of the suction nozzle out of the fish there is a switch from a first vacuum unit to a second vacuum unit which has a lower partial pressure than the first vacuum unit, and the slide valve is opened after switching to the second vacuum unit.

2. A method according to claim 1, characterized in that opening of the abdominal cavity takes place in an abdominal wall, beginning from an anus to an end of the abdominal cavity in a region of lateral fins, detaching a hind gut in the region of the anus.

3. A method according to claim 1, characterized in that scraping out and aspiration of the entrails take place along a centre bone of the fish, wherein at the same time the partially detached entrails are aspirated, and the membrane of the blood kidney is partially opened by means of a blade arranged in a region of the suction nozzle.

4. A method according to claim 1, characterised in that the suction nozzle is connected to a first vacuum unit with high partial pressure during aspiration of the entrails.

5. A method according to claim 4, characterised in that a vacuum is built up in a cyclone by closing a ball valve in the first vacuum unit, and in the section of the suction pipe between the ball valve and the cyclone.

6. A method according to claim 1, characterised in that the entrails are guided at a very low speed into a separate collecting receptacle separated from a cyclone for receiving blood and water.

7. A method according to claim 6, characterised in that the entrails impinge at a low angle α to a peripheral surface of the collecting receptacle and slide down over the peripheral surface in a direction of a bottom flap.

8. A method according to claim 6, characterised in that the level of the entrails in the collecting receptacle is monitored.

9. A method according to claim 7, characterised in that, when the collecting receptacle is full, before opening the bottom flap for at least partially depositing the entrails on a conveyor belt and/or screen belt, inside the collecting receptacle a dividing means is closed so that the partial pressure within the collecting receptacle is maintained.

10. A method according to claim 1, characterised in that, after extraction of the entrails, the suction nozzle is connected to the first vacuum unit by switching again, so that the entrails of a subsequent fish can be aspirated.

11. A method according to claim 10, characterised in that, before aspiration of the entrails, a vacuum is again built up in the first vacuum unit by closing a ball valve.

12. A method according to claim 1, characterised in that the membrane of the blood kidney is fully opened by the suction scrapers.

13. A method according to claim 1, characterised in that the suction scrapers are connected to a first vacuum unit for removing blood and water.

14. A method according to claim 13, characterised in that in the suction pipes between the suction scrapers and the first vacuum unit a vacuum is built up by closing ball valves.

15. A method according to claim 1, characterised in that blood and water are conducted into a cyclone, wherein blood and water enter the cyclone tangentially.

16. A method according to claim 1, characterised in that, upon opening of the abdominal cavity after entry into an anal opening, the abdominal wall is pulled upwards, away from the entrails.

17. A method according to claim 3, characterised in that, during the cut of the blade for opening the membrane of the blood kidney by means of the blade of the suction nozzle, the entrails remain intact.

18. An apparatus, for carrying out the method according to claim 1, essentially including a conveyor with at least one fish receptacle for receiving the fish to be processed and conveying the fish in a direction of a processing station, means arranged in a region of a conveyor for opening the abdominal cavity, for scraping out and aspirating the entrails, for completely opening the membrane of the blood kidney and for aspirating blood and water as well as for extracting entrails and blood and water from the abdominal cavity, characterised in that the means for aspirating and extracting the entrails on the one hand and the means for aspirating and extracting the blood and water on the other hand are connected by separate suction pipes to separate collecting receptacles, and the connections between the means for aspirating and extracting the entrails and the means for aspirating and extracting the blood and water with their respective suction pipes and collecting receptacles are selectively switched between each respective connection, said means for aspirating and extracting the blood and water comprises a suction nozzle and a first vacuum unit, and said means for aspirating and extracting the entrails comprises said suction nozzle, said first vacuum unit and a second vacuum unit.

19. An apparatus according to claim 18, characterised in that all the means for aspirating and extracting the entrails and blood and water are connected to a first vacuum unit.

20. An apparatus according to claim 19, characterised in that the first vacuum unit essentially consists of a vacuum pump with a filter, a cyclone as the collecting receptacle and suction pipes.

21. An apparatus according to claim 18, characterised in that the means for aspirating and extracting the entrails is additionally connected to a second vacuum unit.

22. An apparatus according to claim 21, characterised in that the second vacuum unit essentially consists of a vacuum pump with a filter, a collecting receptacle and suction pumps.

23. An apparatus according to claim 18, characterised in that a second vacuum unit has a lower partial pressure than a first vacuum unit.

24. An apparatus according to claim 18, characterised in that the suction pipes between a suction nozzle and a first vacuum unit on the one hand and between the suction nozzle and a second vacuum unit on the other hand are connected to each other in a region of a switch.

25. An apparatus according to claim 24, characterised in that, for switching between the vacuum units, in each of the suction pipes is arranged a ball valve or the like.

26. An apparatus according to claim 24, characterised in that, for switching between the vacuum units, in the region of the switch of the suction pipes is arranged a ⅔-way valve.

27. An apparatus according to claim 18, characterised in that in the suction pipes between the means for aspirating and extracting blood and water, namely suction scrapers, and a first vacuum unit, in each case is arranged a ball valve.

28. An apparatus according to claim 18, characterised in that the collecting receptacle for the entrails is constructed such that the entrails impinge at a low angle α on a peripheral surface of the collecting receptacle, so that the entrails then slide down over the peripheral surface smoothly.

29. An apparatus according to claim 28, characterised in that within the collecting receptacle is arranged a dividing means which can be optionally opened or closed.

30. An apparatus according to claim 28, characterised in that in the region of the collecting receptacle are arranged means for detecting a level of entrails in the collecting receptacle.

31. An apparatus according to claim 28, characterised in that behind the collecting receptacle in the direction of flow of the entrails is arranged a conveyor belt.

32. An apparatus according to claim 18, characterised in that the apparatus has a control system with which each individual component can be controlled and/or regulated.

33. An apparatus according to claim 18, characterised in that a suction nozzle has a blade for opening the membrane of the blood kidney, said blade being constructed so as to prevent damage to the entrails in a longitudinal direction.

34. An apparatus according to claim 33, characterised in that the blade is provided with a cover.

* * * * *